United States Patent
Boehme et al.

(10) Patent No.: US 10,331,670 B2
(45) Date of Patent: *Jun. 25, 2019

(54) VALUE RANGE SYNOPSIS IN COLUMN-ORGANIZED ANALYTICAL DATABASES

(71) Applicant: INTERNATIONAL BUSINESS MACHINES CORPORATION, Armonk, NY (US)

(72) Inventors: Thomas F. Boehme, Boeblingen (DE); Andreas Brodt, Gerlingen (DE); James L. Finnie, Boeblingen (DE); Oliver Schiller, Dettingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/711,216

(22) Filed: Sep. 21, 2017

(65) Prior Publication Data
US 2018/0011923 A1    Jan. 11, 2018

Related U.S. Application Data

(63) Continuation of application No. 15/147,983, filed on May 6, 2016.

(51) Int. Cl.
*G06F 16/22* (2019.01)
*G06F 16/28* (2019.01)
*G06F 16/2455* (2019.01)

(52) U.S. Cl.
CPC ........ *G06F 16/2455* (2019.01); *G06F 16/221* (2019.01); *G06F 16/289* (2019.01)

(58) Field of Classification Search
CPC ... G06F 16/221; G06F 16/289; G06F 16/2455
See application file for complete search history.

(56) References Cited

U.S. PATENT DOCUMENTS 8,626,725 B2     1/2014 Netz et al.
2008/0059412 A1*  3/2008 Tarin ................... G06F 16/283
(Continued)

OTHER PUBLICATIONS

IBM: List of IBM Patents or Patent Applications Treated As Related (Appendix P), Oct. 13, 2017, pp. 1-2.
(Continued)

*Primary Examiner* — Richard L Bowen
(74) *Attorney, Agent, or Firm* — Kenneth Han (57) ABSTRACT

The method may include providing, in accordance with a column-oriented storage technique, the data table as columns corresponding to the plurality of attributes, whereby each column includes a plurality of separate data blocks. The method may also include determining the plurality of records of the provided data table for which a plurality of attribute values of at least one selected column is contained in a plurality of predetermined data blocks. The method may further include determining, for each column of at least a part of the plurality of columns within the determined plurality of records, a plurality of attribute value information descriptive of an associated attribute within the column and providing an indication of the one or more data blocks for which the plurality of attribute value information is determined. The method may also include storing the determined plurality of attribute value information for enabling query processing.

16 Claims, 3 Drawing Sheets

(56) References Cited

U.S. PATENT DOCUMENTS

| | | | |
|---|---|---|---|
| 2008/0235250 A1* | 9/2008 | Tarin | G06F 16/283 |
| 2009/0106210 A1 | 4/2009 | Slezak et al. | |
| 2011/0246432 A1 | 10/2011 | Yang et al. | |
| 2012/0254199 A1 | 10/2012 | Kuno et al. | |
| 2012/0323923 A1* | 12/2012 | Duan | G06F 16/24554 707/741 |
| 2014/0095502 A1 | 4/2014 | Ziauddin et al. | |
| 2014/0095520 A1 | 4/2014 | Ziauddin et al. | |
| 2015/0032684 A1* | 1/2015 | Gupta | G06F 17/30575 707/600 |
| 2015/0199407 A1 | 7/2015 | Ziauddin et al. | |
| 2015/0286681 A1 | 10/2015 | Baer et al. | |
| 2015/0286682 A1 | 10/2015 | Ziauddin | |
| 2015/0347426 A1 | 12/2015 | Dickie et al. | |
| 2015/0363447 A1 | 12/2015 | Dickie | |
| 2016/0026667 A1* | 1/2016 | Mukherjee | G06F 17/30339 707/714 |
| 2016/0350347 A1* | 12/2016 | Das | G06F 17/30463 |
| 2017/0277752 A1* | 9/2017 | Oyamada | G06F 12/00 |
| 2018/0349422 A1* | 12/2018 | Tsuchida | G06F 3/0611 |

OTHER PUBLICATIONS

Bayliss et al., "Zone Map and Attribute Clustering Examples," Oracle Data Warehousing and Very Large Databases, Last Modified on Jul. 31, 2014, p. 1-3, GitHub, Inc., https://github.com/oracle/dw-vldb/tree/master/att_clu_zone_map, Accessed on Apr. 29, 2016.

Bloom, "Space/Time Trade-offs in Hash Coding with Allowable Errors," Communications of the ACM, Jul. 1970, p. 422-426, vol. 13, Issue 7.

Boehme et al., "Executing Conditions With Negation Operations in Analytical Databases," Application and Drawings, filed Oct. 27, 2015, 48 Pages, U.S. Appl. No. 14/923,690.

Boehme et al., "Method for Storing a Dataset," Application and Drawings, filed Nov. 18, 2015, 43 Pages, U.S. Appl. No. 14/944,256.

Bonomi et al., "An Improved Construction for Counting Bloom Filters," Algorithms—ESA 2006, 2006, p. 684-695, LNCS 4168, Springer-Verlag Berlin Heidelberg.

Ensslen, "Redshift Zone Maps as an 'Indexing' Strategy," Optimal Business Intelligence Blog, Dec. 8, 2014, p. 1-4, OptimalBI Ltd., http://optimalbi.com/blog/2014/12/08/redshift-zone-maps-as-an-indexing-strategy/, Accessed on Apr. 29, 2016.

Gardi, "Efficient Algorithms for Disjoint Matchings among Intervals and Related Problems," Discrete Mathematics and Theoretical Computer Science, 2003, p. 168-180, LNCS 2731, Springer-Verlag Berlin Heidelberg.

Oracle, "Attribute Clusters and Zone Maps," Oracle Database 12c Tutorial, p. 1-27, http://www.oracle.com/webfolder/technetwork/tutorials/obe/db/12c/r1/12c_aczm/12c_aczm.html, Accessed on May 4, 2016.

Oracle, "Partition Pruning with Zone Maps," Oracle Database VLDB and Partitioning Guide, p. 1-2, Oracle Database Online Documentation 12c Release 1 (12.1), Chapter 3, https://docs.oracle.com/database/121/VLDBG/GUID-65DA5654-970B-4056-BFBF-C300C9A8AA2A.htm#VLDBG14101, Accessed on May 2, 2016.

Oracle, "Using Zone Maps," Oracle Database Data Warehousing Guide, p. 1-24, Oracle Database Online Documentation 12c Release 1 (12.1), Chapter 13, http://docs.oracle.com/database/121/DWHSG/zone_maps.htm#DWHSG9355, Accessed on Apr. 29, 2016.

Ślęzak, "Brighthouse: An Analytic Data Warehouse for Ad-hoc Queries," PVLDB '08, Aug. 23-28, 2008, p. 1337-1345, VLDB Endowment, ACM, Auckland, New Zealand.

Boehme et al., U.S. Appl. No. 15/147,983, filed May 6, 2016, titled "Value Range Synopsis in Column-Organized Analytical Databases", pp. 1-29.

* cited by examiner

| | 303 | 301A | | 305A | 301B | | 305B | 301C | | 305C |
|---|---|---|---|---|---|---|---|---|---|---|
| | | ID | | | Name | | | Birthday | | |
| Max Row# | Min | Max | Page# | Min | Max | Page# | Min | Max | Page# |
| 2 | 137561 | 137562 | 1 | Fritz | Hans | 3 | 1955-02-12 | 1975-04-27 | 6 |
| 3 | 137563 | 137563 | 1 | Robert | Robert | 4 | 1982-09-17 | 1982-09-17 | 6 |
| 4 | 137564 | 137564 | 2 | Otto | Otto | 4 | 1972-01-11 | 1972-01-11 | 6 |
| 5 | 137565 | 137565 | 2 | Emma | Emma | 4 | 1969-10-23 | 1969-10-23 | 7 |
| 7 | 137567 | 137567 | 2 | Heiner | Marlene | 5 | 1964-06-18 | 1990-11-07 | 7 |

FIG. 3

| Min | Max | Page# | Min Row # | Max Row # |
|---|---|---|---|---|
| 1955-02-12 | 1982-09-17 | 6 | 1 | 4 |
| 1964-06-18 | 1990-11-07 | 7 | 5 | 7 |

FIG. 4

VALUE RANGE SYNOPSIS IN COLUMN-ORGANIZED ANALYTICAL DATABASES

BACKGROUND

The present invention relates to the field of digital computer systems, and more specifically, to a method for processing a data table.

Analytical database systems manage very large amounts of data and are optimized for queries that must read large portions of data. At the same time, analytical database systems offer the complete querying power of Structured Query Language (SQL). As such systems do not focus on on-line transaction processing (OLTP) load (i.e. involving point queries), each data row is not typically indexed but scan performance is heavily relied upon. Hence, there is a continuous need to improve scan performance in analytical database systems which are stored in accordance with a column-oriented storage technique.

SUMMARY

Various embodiments provide a method for processing a data table, computer system and computer program product as described by the subject matter of the independent claims. Advantageous embodiments are described in the dependent claims. Embodiments of the present invention can be freely combined with each other if they are not mutually exclusive.

According to one embodiment, a method for processing a data table is provided. The method may include providing, in accordance with a column-oriented storage technique, the data table as a plurality of columns corresponding to the plurality of attributes, whereby each column of the plurality of columns includes a plurality of separate data blocks. The method may also include determining the plurality of records of the provided data table for which a plurality of attribute values of at least one selected column of the plurality of columns is contained in a plurality of predetermined data blocks. The method may further include determining, for each column of at least a part of the plurality of columns within the determined plurality of records, a plurality of attribute value information descriptive of an associated attribute within the column and providing an indication of the one or more data blocks for which the plurality of attribute value information is determined. The method may also include storing the determined plurality of attribute value information for enabling query processing.

According to another embodiment, a computer system for processing a data table is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include providing, in accordance with a column-oriented storage technique, the data table as a plurality of columns corresponding to the plurality of attributes, whereby each column of the plurality of columns includes a plurality of separate data blocks. The method may also include determining the plurality of records of the provided data table for which a plurality of attribute values of at least one selected column of the plurality of columns is contained in a plurality of predetermined data blocks. The method may further include determining, for each column of at least a part of the plurality of columns within the determined plurality of records, a plurality of attribute value information descriptive of an associated attribute within the column and providing an indication of the one or more data blocks for which the plurality of attribute value information is determined. The method may also include storing the determined plurality of attribute value information for enabling query processing.

According to yet another embodiment, a computer program product for processing a data table is provided. The computer program product may include one or more computer-readable storage devices and program instructions stored on at least one of the one or more tangible storage devices, the program instructions executable by a processor. The computer program product may include program instructions to provide, in accordance with a column-oriented storage technique, the data table as a plurality of columns corresponding to the plurality of attributes, whereby each column of the plurality of columns includes a plurality of separate data blocks. The computer program product may also include program instructions to determine the plurality of records of the provided data table for which a plurality of attribute values of at least one selected column of the plurality of columns is contained in a plurality of predetermined data blocks. The computer program product may further include program instructions to determining, for each column of at least a part of the plurality of columns within the determined plurality of records, a plurality of attribute value information descriptive of an associated attribute within the column and providing an indication of the one or more data blocks for which the plurality of attribute value information is determined. The computer program product may also include program instructions to storing the determined plurality of attribute value information for enabling query processing.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The attribute value information may be descriptive of the attribute. Using the attribute value information a preselection of data blocks of the data table may be performed before scanning the preselected data blocks. The attribute value information may include information or metadata on the attribute that allows such a preselection. In one example, the attribute value information may include at least one of a minimum attribute value of the attribute in the first data block and a maximum attribute value of the attribute of the first data block.

For example, the maximum and the minimum attribute values define a first range of values of the attribute in a respective first data block. For example, a received data query may require a second range of values of the attribute. The processing of the data query may include selecting data blocks of the data table whose respective first range overlap with the second range and processing those selected data blocks (that forms a scan list).

The term "data block" as used herein may refer to a logical or physical storage unit for storing the data of the data table. The data block may be the smallest storage unit that is handled by a database management system or an operating system of the computer system.

The present method may combine the advantages of logical and per-column attribute value information for column-oriented analytical databases. The present method may take into account the physical storage units (e.g. pages), which may be different for each column. At the same time the ability to intersect the row number ranges identified for basic predicates on different columns may be kept, so that the input and/or output (I/O) may be largely reduced and scan evaluation load in the presence of conjunctions over these predicates.

Another advantage may reside in the fact that the present method may speed up the process of accessing or querying the data table. For example, providing attribute value information without taking into account the physical storage properties of the rows may end up with multiple attribute value information where every attribute value information of the multiple attribute value information corresponds to multiple storage data blocks. Thus, for every selected attribute value information, multiple data blocks have to be scanned.

According to one embodiment, the predetermined number of data blocks may include a single data block. This may be advantageous as it may reduce the scanning time by scanning for each selected set of records a corresponding single data block only. For example, using the present method multiple set of records may be determined that cover the whole data table. Using the attribute value information, a scan list may be determined which, depending on the query condition, may include only part of the multiple set of records. For the selected set of records, only corresponding single data blocks may be scanned. This may particularly be advantageous if the scan list includes a minimum number of set of records.

According to one embodiment, the predetermined number of data blocks may include more than one data block in case the selected column has a number of attribute values per data block smaller than a predetermined threshold. This may be advantageous as it may avoid having an unreasonable number of records which may constrain the processing of the data table.

According to one embodiment, the more than one data block may include a number of attribute values that is equal or higher than the predetermined threshold. This embodiment may enable dynamic control the content of each set of records using the predetermined threshold.

According to one embodiment, the method may further include selecting the at least one column if the number of records per data block of the column is higher than a predetermined threshold. In other words, the selected column with a high content density may be treated such that each set of records may not span more than the predetermined number of data blocks. However, scanning data blocks with high density may consume more processing resources compared to scanning the same number of data blocks with smaller density in particular if more than the predetermined number of data blocks is scanned. Thus, it may be advantageous to have the column with highest density treated, as in the present embodiment. Furthermore, this may be particularly desirable if the query history indicates that the non-selected column is never referenced in a query predicate. Thus, the computer system may keep track of the query predicates that reference a low-density column; and the next time the present method may be executed, all low-density columns are excluded from the attribute value information determination (e.g. if they have never occurred in a query filter).

According to one embodiment, the at least part of the set of columns being selected at load time by determining that each column of the at least part of the set of columns has a number of values per data block higher than a predetermined threshold. This may be advantageous as the set of records may be reliable in contrast to the case where the set of records are determined using columns with low density. This may further speed up the processing of the data table. The load time may be the time at which the set of columns are initially stored.

According to one embodiment, the method further includes repeating the determining and storing steps for a further set of records of the data table until all records of the data table are processed. This may enable processing the whole data table while taking the above described advantage of a single set of records.

According to one embodiment, the at least one selected column may include all columns of the set of columns. This may be particularly advantageous in case the query conditions or processing involve all columns of the data table.

According to one embodiment, the attribute value information may further include an indication of each record of the set of records.

According to one embodiment, the attribute value information may further include an indication of the first record and the last record of the set of records, the set of records being contiguously stored.

These embodiments may have the advantage that the ability to intersect the row number ranges identified for basic predicates on different columns may be kept, so that one can largely reduce the I/O and scan evaluation load in presence of conjunctions over these predicates.

Figure 1:
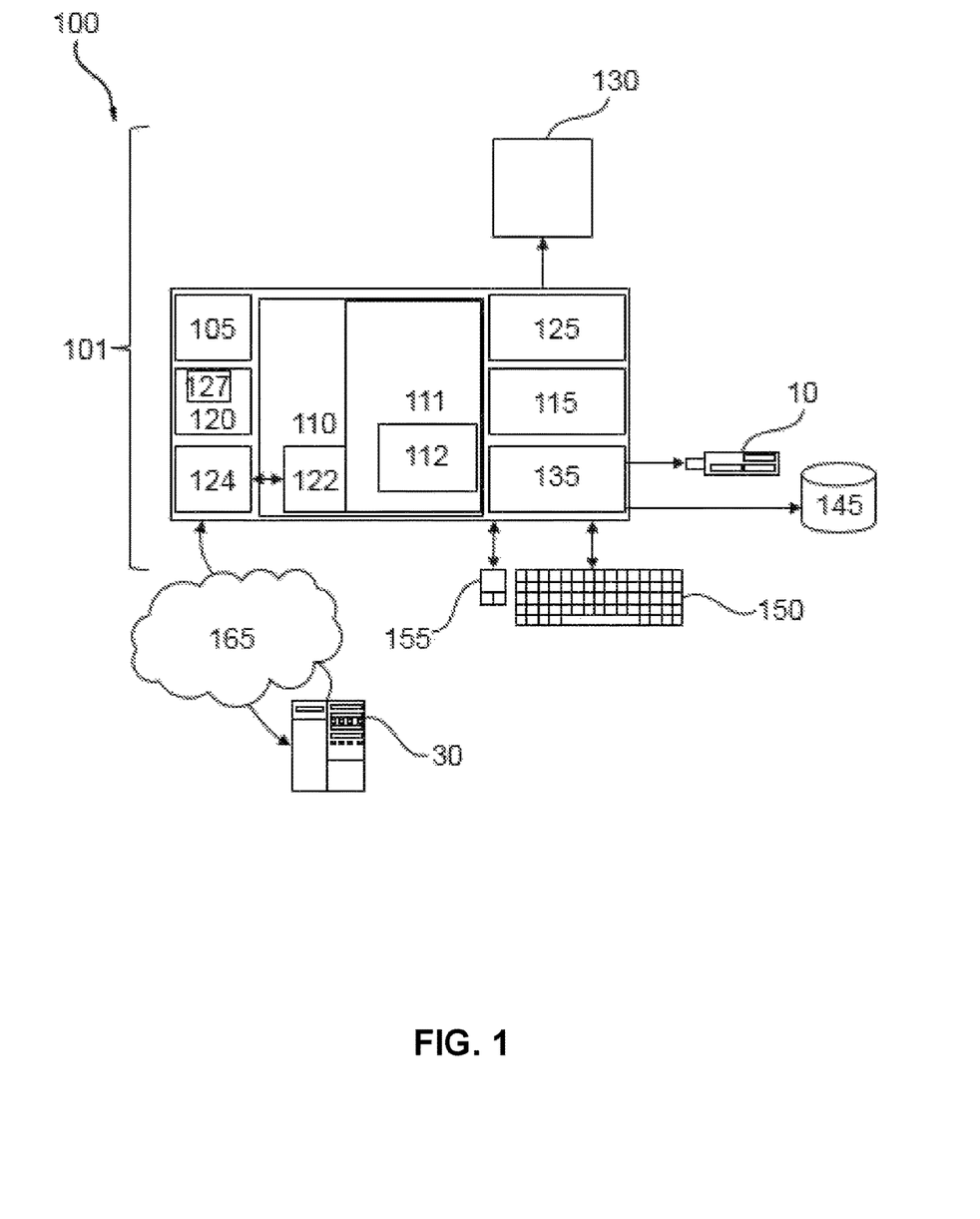
FIG. 1 represents a computerized system, suited for implementing one or more method steps as involved in the present disclosure.

FIG. 1 represents a general computerized system suited for implementing method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and are executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more I/O devices (or peripherals) 10, 145 that are communicatively coupled via a local I/O controller 135. The I/O controller 135 can be, but is not limited to, one or more buses or other wired or wireless connections, as is known in the art. The I/O controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein, the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which includes an ordered listing of executable instructions for implementing logical functions, notably functions involved in embodiments of this invention. In the example of FIG. 1, software in the memory 110 includes instructions 112 e.g. instructions to manage databases such as a database management system. The memory 110 may further include a query optimizer. The query optimizer may include instructions e.g. software instructions that when executed may provide a query execution plan for executing a given query.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, the program needs to be translated via a compiler, assembler, interpreter, etc., which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the I/O controller 135. Other output devices, such as the I/O devices 145, may include input devices, for example, but not limited to, a printer, a scanner, and microphone. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, and a router. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an internet protocol-based network for communication between the computer 101 and any external server, client, etc. via a broadband connection. The network 165 transmits and receives data between the computer 101 and external systems 30, which can be involved to perform part or all of the steps of the methods discussed herein. In exemplary embodiments, network 165 can be a managed internet protocol (IP) network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a personal computer (PC), workstation, intelligent device, etc., the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may include a disk storage, such as hard disk drive (HDD) storage.

The storage 120 may include at least one data table (or data set) 127. For example, the software 112 may receive (automatically or upon request) as input the data table 127, or may download the data table 127 from storage 120 or memory 110.

The term "data table" or data set as used herein refers to a collection of data that may be presented in tabular form. Each column in the data table may represent a particular variable or attribute. Each row in the data table may represent a given member, record or entry of the data table.

Figure 2:
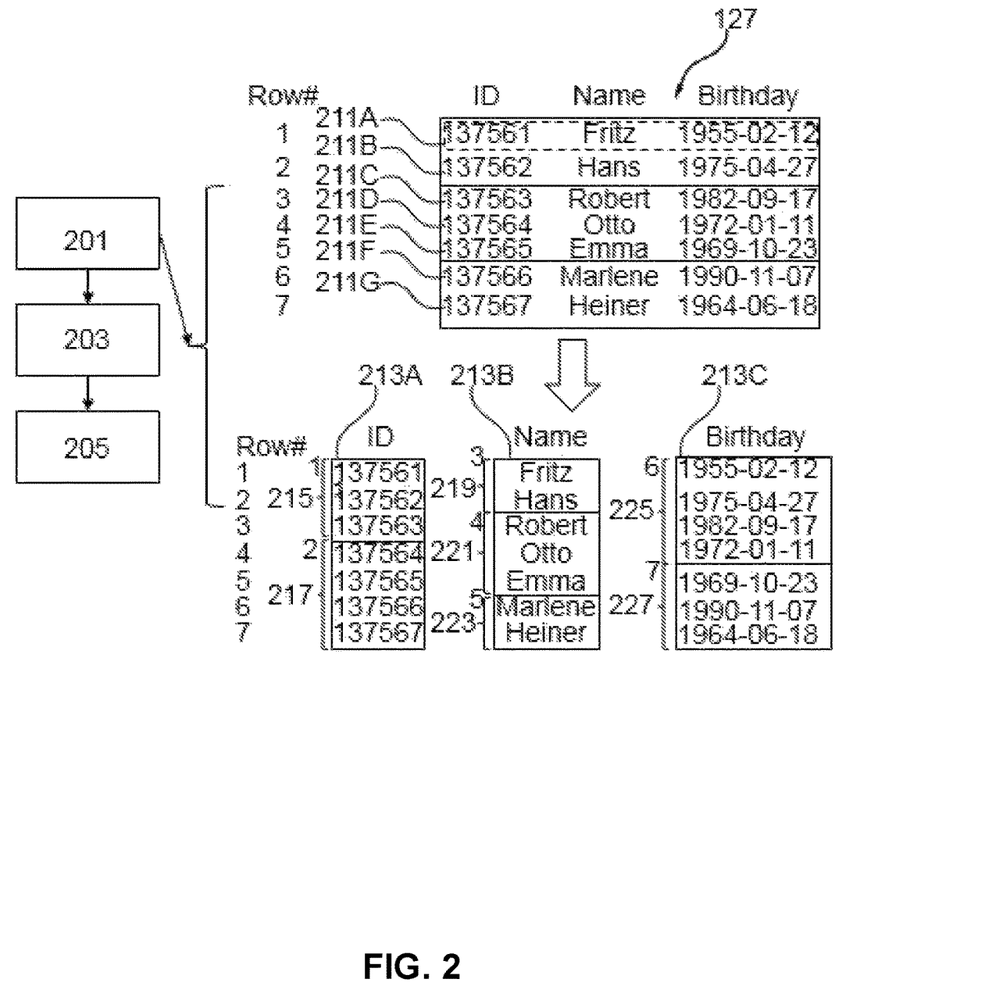
FIG. 2 is a flowchart of a method for processing a data table.

FIG. 2 is a flowchart of a method for processing a data table e.g. data table 127. FIG. 2 shows an example data table 127 having multiple records or rows 211A-G and a set of attributes, such as "Name," "ID," and "Birthday." The data table 127 may be provided or stored in accordance with a column-oriented storage technique in a set of columns 213A-C, as shown in FIG. 2, corresponding to the set of attributes. Each column of the set of columns 213A-C includes respective data blocks. For example, FIG. 2 shows column 213A that corresponds or represents attribute "ID" includes two data blocks 215 and 217. Data blocks 215-227 may, for example, include data pages having respective page numbers 1-7, as shown in FIG. 2.

The term "data block" or "storage unit" as used herein is intended to refer to the minimum addressable unit (e.g. by software 112 such as a database management system or an operating system) in order to store the data table 127. The data block may refer to a logical or physical storage unit for storing the data of the data table. The rows of each data block e.g. 215 of the data table 127 may be stored on contiguous, linked, or indexed disk units (e.g. of storage 120).

In step 201, a set of records of the data table 127 may be determined or identified such that the set of values of at least one selected column (i.e. set of values of the attribute represented by the selected column) of the set of columns of the set of records is contained in a single data block. The set of records may be the first set of records or rows of the data table 127 or any other set of records of the data table that fulfils the condition of step 201. This may for example be useful for selective analysis of the data table 127 where the whole content is not required, such as for test purposes. Therefore, processing resources otherwise required for the processing of the whole data table may be saved.

In other words, the set of records may be determined to include a number of records that is smaller than a predetermined limit. The limit may be defined using one or more columns of the data table 127. For example, if the at least one selected column is a single column, the limit may be defined using the boundaries of the data blocks on which the selected column is stored. A boundary refers to the first and/or last row that is stored in a given data block. The set of records may be determined or collected starting from a row of the data table 127 that is stored as the first row of a given data block and including one or more subsequent rows until the limit (e.g. the last row) is reached e.g. each subsequent row to be included is stored within the given data block. If the given data block stores 10 rows, the limit may be equal to or smaller than 10.

In another example, if the at least one selected column includes two columns of the data table 127, then the limit may be defined using the boundaries of both data blocks on which the first selected column is stored and data blocks on which the second selected column is stored. The first row to be included in the set of records may be the first row stored on a first and second data blocks in which the first and second selected columns are stored respectively. The limit may be defined as the smallest boundary of the first and second data block. Using the example of data table 127 and assuming that columns 213A and 213B are selected, the first boundary would correspond to row number 3 for column 211A and the second boundary would correspond to row number 2 for column 213A. In this case the limit is row number 2.

The selected column may be a column e.g. 213A having the number of records per data block higher than a predetermined threshold. The predetermined threshold may for example include the maximum number of records that can be in a data block for each of the columns. This may enable to select the column which has the highest density. This may be advantageous as it may prevent scanning for a given set of records of multiple data blocks. In other words, the selected column that has a high content density may be treated such that each set of records may not span multiple data blocks. However, for a given set of records scanning multiple data blocks may be time and processing resource consuming compared to scanning a single data block in particular for the selected column having a high density. This may enable the set of records to span multiple data blocks of the other columns which are less dense.

For example, column 213A may be selected as it has a number of records per data block that is greater than two records, which may be the threshold. In this case, the set of records that is to be determined in step 201 may be the records 211A, 211B, and/or 211C. In another example, the selected column may be user defined.

For example, if column 213A is the selected column, records 211A, 211B, and 211C may be identified in step 201 because the set of values of attribute "ID" namely 137561, 137562 and 137563 are contained in a single data block 215. In another example, if the selected columns includes all columns of data table 127, records 211A, 211B may be identified because each of the attributes "ID," "Name," and "Birthday" having values contained in a respective single data block 215, 219 and 225.

The determined set of records may be for a given column a logical representation of rows of one or more data blocks over which the given column is stored.

In step 203, for each column of at least part of the set of columns 213A-C attribute value information descriptive of the attribute of the set of records of the column may be determined. The attribute value information of each column may include the extremum values or distinct values of the attribute corresponding to the column in the set of records. The attribute value information may further include an indication of the one or more data blocks over which attribute values of each column of at least part of the set of columns are stretched. In the example where the set of data records 211A, 211B and 211C is identified in step 201, the attribute value information may be determined for each of columns 213A-B. For example, for column 213B the attribute value information may indicate data blocks 219 and 220 over which the set of values of the attribute "Name" of the records 211A, 211B and 211C is stretched.

The attribute value information may further include row numbers of the rows of the set of records.

The attribute value information may have the following properties:
1. The attribute value information may operate on the granularity of physical storage blocks. For example, the attribute value information may be determined for records or rows that do not span multiple storage units or data blocks (e.g. pages) in any column.
2. The attribute value information may contain the range of row numbers.

The attribute value information may contain the storage unit (e.g. page number) in which the respective values of the attribute are stored. The storage locations may as well be looked up given the range of row numbers.

In step 205, the attribute value information may be stored e.g. in memory 110 for enabling query processing. For example, the attribute value information may be used for defining a scan list of data blocks to be scanned in order to evaluate a query on the data table. For example, a query having a condition "ID<137563" would be processed by reading the attribute value information of the attribute "ID" and identifying data blocks that may include values of "ID" that satisfy the condition. In this case, the set of records that includes rows 211A-B may be selected and thus there is no need to scan both data blocks 215 and 217 (i.e. only data block 215 would be scanned) and thus processing resources may be save. In addition, using the row numbers associated with the records of the set records other data blocks of other columns of the data table may be scanned as well. For example, using row number 211A, data blocks 219 and 225 may be selected for scanning. Thus, the determination of the set of records based on all columns may be advantageous as it may limit the scan for a given selected set of records to a single data block per column.

In another example, steps 201-205 may be repeated such that they may be performed set by set of records of the data table 127 until all records of the data table 127 are processed.

Figure 3:
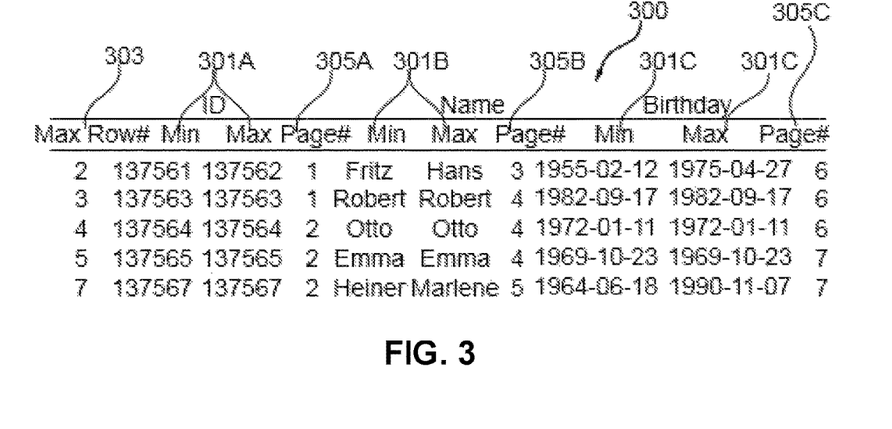
FIG. 3 depicts a table indicating the attribute value information for every column in multiple set of records.

FIG. 3 depicts a table 300 indicating the attribute value information for every attribute or column and for multiple set of records of the data table 127. In other words, table 300 shows attribute value information entries that refer to all columns of data table 127 for all set of records of the data table 127.

Each set of the multiple sets of records for which the attribute value information is represented in table 300 is determined as described in step 201. For determining the first set of records of the multiple sets of records, the present method may start including the first row of the data table 127 and may add every subsequent row of the data table 127 to the first set of records, if the values of each attribute of the subsequent row to be added are within a respective single data page or data block. For example, the first set of records includes the two first rows of data table 127. The third row is not included in the first set of records because the value of attribute "Name," which is Robert, belongs to a different data block 221 compared to the two first values Fritz and Hanz which belong to data block 219. Thus the second set of records would be determined starting from the third row. The second set of records can only include the third row because the subsequent fourth row has an attribute value 137564 of attribute "ID" which belongs to a different data block 217 than the ID value of the third row. This method of determining the set of records is repeated until all records of the data table 127 are processed.

Thus, in this example, the attribute value information is determined for each set of records that do not span multiple storage units (e.g. pages) of any column or attribute.

The attribute value information in table 300 includes the minimum and maximum values 301A, 301B, and 301C of each attribute "ID," "Name," and "Birthday," respectively. The attribute value information is provided for each set of records, as defined above. The set of records or rows is indicated in column 303. For example, the first set of records includes the two first rows of data table 127. The second set of records includes the third row of data table 127. The last set of records includes the sixth and seventh rows of data table 127.

Table 300 further indicates for each set of records and for each attribute the page numbers (or data block identifiers) where the values of the attribute are stored. Columns 305A-C indicate the page numbers for the respective attribute. The page numbers 1-7 as also shown in FIG. 2 correspond to the data blocks 215-227 respectively.

Figure 4:
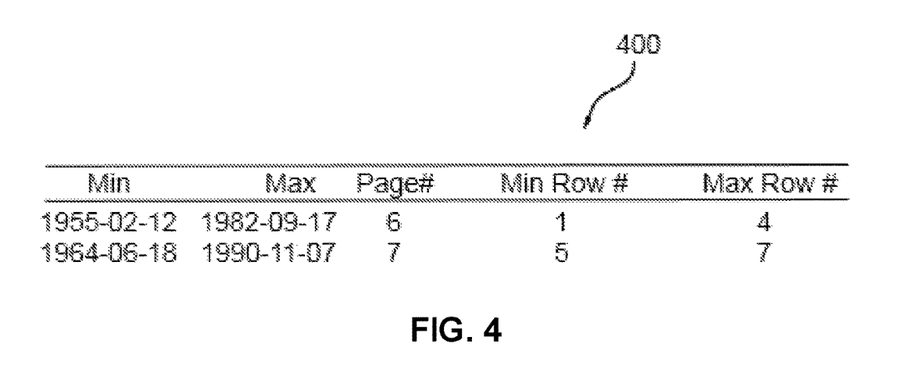
FIG. 4 depicts a table indicating the attribute value information for a given column in multiple set of records.

FIG. 4 depicts a table 400 indicating the attribute value information only for a given attribute ("Birthday") of the data table 127 and for each set of records of the data table 127, as defined above. In this case, the set of records of step 201 may be determined based on storage property of values of the attribute "Birthday" only. That is, each set of records may include values of the attribute "Birthday" which is stored in a single data page regardless of how the other attribute values of the other attributes are stored. For example, table 400 shows the first set of records as containing the first through fourth rows of the table 127 although the first four rows span more than one data page for attributes "ID" and "Name."

In one example, the multiple sets of records may be defined or determined as follows. The sets of records that may be defined on a fixed number n of rows (e.g. n=1024), and thus it may be acceptable to use a page boundary that is sufficiently close to the next multiple of 1024 rows. Thus, if a page boundary occurred in some column (e. g. 980 rows after the beginning of the current set of records), the system may start a new set of records immediately. Also, if the current set of records is already larger than n rows, the system may not start a new set of records until a page boundary occurs in any page. Therefore, the set of records may correspond to the page boundaries at least to some degree.

As an optimization, the system may take organizing columns into account. Organizing columns can be defined on columns that will be referenced in query predicates particularly often. The computer system may then sort the data by the organizing columns, so that the set of records achieve the best possible filter effect. Assuming that organizing columns were properly defined, the set of records may correspond to their storage units. Thus, if a page boundary of an organizing column is sufficiently close to the next multiple of n rows, it takes precedence and is used to delimit the current set of records. A page boundary in some other column is only used if the distance to the next page boundary of an organizing column is too far.

As shown in table 400, the attribute value information may be extended by the respective range of row numbers (e.g. first through fourth rows form the first set of records of table 400). The row numbers may thus re-establish the relation across columns. Table 400 illustrates this for the "Birthday" column of table 127. If the set of records is (1) ordered by row number and (2) always scanned linearly, then the minimal row number can also be skipped as it always equals the maximal row number of the preceding data block. These may create a set of records that may exactly correspond to storage units. In addition to that, the computer system may keep track of the boundaries of the set of records (e.g. the last and/or first row of a given set of records may form a boundary) that occurred at all columns when creating the set of records (e.g. at a data loading operation or a reorganization). This may be done by recording the row numbers at which the boundaries occurred.

In another example, the multiple set of records may be created as follows taking into account one column of the data table 127. The computer system may process row by row the data table 127 in order to create the multiple sets of records. For a current set of records and a current row, the computer system may compute the expected number of rows that will still fit into the current storage unit (or data blocks 215-227) for every column or attribute (e.g. attributes "ID," "Name," and "Birthday") using a heuristic. One such heuristic may be the average number of values (of this column) per storage unit so far, minus the number of values already contained in the current storage unit at this point. If the boundary of the last set of records in a given column occurred more than n rows before the current row and the computer system expects or determines that more than n rows still fit into the current storage unit of the given column, then the computer system may decide to terminate the current set of records and starting a new set of records for the same storage unit. This may prevent having huge sets of records while maintaining the advantage of having boundaries of the set of records corresponding to the boundaries of the storage units. A boundary of a storage unit may be defined as the last row that belongs to a physical storage unit. For example, data block 215 has a boundary in the third row because the value of attribute "ID" 137563 is the last one stored in data block 215. Thus, a set of records that includes only the first through third rows attribute ID would have a boundary that corresponds to the storage unit for attribute values of attribute "ID."

In another example, the multiple sets of records may be created as follows taking into account all columns of data table 127. This may be in the interest of corresponding boundaries of the set of records across columns. For that, the computer system may incorporate the situation at other columns before introducing a new set of records as follows:

1. If the last boundary of the last set of records at column c is more than n rows ago and at least n more values are expected before the next boundary of the current set of records, the computer system may check whether a boundary of the current set of records is expected for any other column within the next $\delta$ rows (e.g. for a following number of rows that is smaller than a predetermined threshold e.g. the next 10 or fewer rows). If such a column exists, the new set of records in column c is not started immediately, but at the time the next boundary of the current set of records occurs at any column. As an optimization, organizing columns can take precedence (e.g. if there are several columns that will have a boundary soon (i.e. any column could be picked) and if a column is an organizing column then this one should be picked). In another example, if there is more than one organizing column, the organizing column that will have a boundary soon may be selected such that the current set of records includes records until reaching the boundary of this selected organizing column.
2. If the heuristics were wrong so that no boundary occurred after $\delta$ values and still at least n values are expected for the current storage unit of column c, the system may introduce a new set of records for column c that is disconnected from other columns.
3. If a zone boundary occurs at any column, the computer system may check whether other columns might want to participate and introduce a boundary at the same row number as well. Such columns must have at least $n-\delta$ values in their current set of records and may expect at least $n-\delta$ values to fit into it. Alternatively, only organizing columns may trigger such a common boundary.

In another example, a method for processing a data table in a database management system is provided. The data table has multiple records and involves a set of attributes. The method includes: storing the data table attribute[column]-wise on multiple data blocks; (logically) arranging records of the data table to sets of records, each set not stretching over data block boundaries [strict condition] or each set boundary matching data block boundaries of at least one attribute [relaxed condition]; associating a piece of attribute value information with each set of records; including information indicating the records involved to each piece of attribute value information; and storing attribute value information for enabling query processing.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, etc., and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product of improving a speed at which accessing or querying of a data table is processed, wherein the data table has a plurality of records and a plurality of attributes, the computer program product comprising:

one or more computer-readable tangible storage medium and program instructions stored on at least one of the one or more tangible storage medium, the program instructions executable by a processor, the program instructions comprising:

program instructions to provide, in accordance with a column-oriented storage technique, the data table as a plurality of columns corresponding to the plurality of attributes, wherein each column of the plurality of columns is comprised of a plurality of separate data blocks;

program instructions to determine the plurality of records of the provided data table for which a plurality of attribute values of at least one selected column of the plurality of columns is contained in a plurality of predetermined data blocks;

program instructions to determine, for each column of at least a part of the plurality of columns within the determined plurality of records, a plurality of attribute value information descriptive of an associated attribute within the column and providing an indication of the one or more data blocks for which the plurality of attribute value information is determined, wherein the attribute value information includes a minimum attribute value of the attribute values and a maximum attribute value of the attribute values in each predetermined data block, wherein the attribute value information determined for each set of the plurality of records spans a single storage unit, wherein all low-density columns having a number of values per data block lower than a predetermined threshold are excluded from the attribute value information determination when the low-density columns were not referenced in previous query predicates; and program instructions to store the determined plurality of attribute value information for enabling query processing, wherein the determined plurality of attribute value information defines a scan list of data blocks to be scanned, wherein row numbers associated with the defined scan list of data blocks limit a scan to corresponding data blocks of other columns of the data table.

2. The computer program product of claim 1, wherein the plurality of predetermined data blocks consists of a single data block.

3. The computer program product of claim 1, wherein the plurality of predetermined data blocks comprises more than one data block when the plurality of attribute values for each data block is smaller than a predetermined threshold.

4. The computer program product of claim 3, wherein the more than one data blocks include a plurality of attribute values that are equal to or higher than the predetermined threshold.

5. The computer program product of claim 1, further comprising:

program instructions to select the at least one column, when the plurality of records for each data block of the column is higher than a predetermined threshold.

6. The computer program product of claim 1, wherein the at least part of the plurality of columns is selected at load time, and wherein the selecting comprises determining that each column of the at least part of the plurality of columns has a plurality of values for each data block higher than a predetermined threshold.

7. The computer program product of claim 1, further comprising:

program instructions to repeat determining the plurality of records and storing the determined plurality of attribute value information for a further plurality of records of the data table until all of the plurality of records of the data table are processed.

8. The computer program product of claim 1, wherein the at least one selected column comprises all of the plurality of columns.

9. A computer system of improving a speed at which accessing or querying of a data table is processed, wherein the data table has multiple records and a set of attributes, the computer system being configured for:

providing, in accordance with a column-oriented storage technique, the data table as a plurality of columns corresponding to the plurality of attributes, wherein each column of the plurality of columns is comprised of a plurality of separate data blocks;

determining the plurality of records of the provided data table for which a plurality of attribute values of at least one selected column of the plurality of columns is contained in a plurality of predetermined data blocks;

determining, for each column of at least a part of the plurality of columns within the determined plurality of records, a plurality of attribute value information descriptive of an associated attribute within the column and providing an indication of the one or more data blocks for which the plurality of attribute value information is determined, wherein the attribute value information includes a minimum attribute value of the attribute values and a maximum attribute value of the attribute values in each predetermined data block, wherein the attribute value information determined for each set of the plurality of records spans a single storage unit, wherein all low-density columns having a number of values per data block lower than a predetermined threshold are excluded from the attribute value information determination when the low-density columns were not referenced in previous query predicates; and storing the determined plurality of attribute value information for enabling query processing, wherein the determined plurality of attribute value information defines a scan list of data blocks to be scanned, wherein row numbers associated with the defined scan list of data blocks limit a scan to corresponding data blocks of other columns of the data table.

10. The computer system of claim 9, wherein the plurality of predetermined data blocks consist of a single data block.

11. The computer system of claim 9, wherein the plurality of predetermined data blocks comprises more than one data block when the plurality of attribute values for each data block is smaller than a predetermined threshold.

12. The computer system of claim 11, wherein the more than one data blocks includes a plurality of attribute values that are equal to or higher than the predetermined threshold.

13. The computer system of claim 9, further comprising:
program instructions to select the at least one column, when the plurality of records for each data block of the column is higher than a predetermined threshold.

14. The computer system of claim 9, wherein the at least part of the plurality of columns is selected at load time, and wherein the selecting comprises determining that each column of the at least part of the plurality of columns has a plurality of values for each data block higher than a predetermined threshold.

15. The computer system of claim 9, further comprising:
program instructions to repeat determining the plurality of records and storing the determined plurality of attribute value information for a further plurality of records of the data table until all of the plurality of records of the data table are processed.

16. The computer system of claim 9, wherein the at least one selected column comprises all of the plurality of columns.

* * * * *